United States Patent Office 3,214,447
Patented Oct. 26, 1965

3,214,447
2α-METHYL-11-OXYGENATED ANDROSTANES AND INTERMEDIATES THEREFOR
Howard J. Ringold and George Rosenkranz, Mexico City, Mexico, assignors, by mesne assignments, to Syntex Corporation, a corporation of Panama
No Drawing. Filed Dec. 24, 1957, Ser. No. 704,899
Claims priority, application Mexico, Jan. 3, 1957, 46,694
21 Claims. (Cl. 260—397.45)

The present invention relates to cyclopentanophenanthrene compounds and to a process for the production thereof.

More particularly the present invention relates to novel 2α-methyl-androstan-17β-ol-3-one derivatives having an 11β-hydroxy or 11-keto group, as well as compounds of this type having a 17α-methyl and/or esters of the aforementioned compounds. These compounds are androgenic type hormones having an especially desirable anabolic action. The present invention also relates to certain novel 11-keto and 11β-hydroxy androstane derivatives namely androstan-17β-ol-3,11-dione and androstan-11β-diol-3-one and their esters as well as their 17α-methyl derivatives. These compounds are androgenic type hormones, having an anabolic action as well as valuable intermediates.

In our U.S. patent application Serial No. 636,860, filed January 29, 1957, and U.S. patent application Serial No. 632,016, filed January 2, 1957, both now abandoned, there is disclosed certain 2α-methyl androstane derivatives having a more potent anabolic action as compared to compounds without a 2-alkyl substituent.

In accordance with the present invention it has been discovered that 11β-hydroxy testosterone, 11-keto testosterone and 17α-methyl derivatives of these compounds may be treated with ethyl formate and sodium hydride to form the corresponding 2-hydroxymethylene derivatives, key intermediates and themselves active hormones having anabolic effects. Thereafter the 2-hydroxymethylene derivatives may be treated with methyl iodide to form the 2-methyl-2'-formyl derivatives and these last derivatives upon removal of carbon monoxide are converted to the novel 2α-methyl-11β-hydroxy-testosterone, 2α-methyl-11-keto testosterone or their 17α-methyl derivatives. All of these compounds are active androgenic type hormones having pronounced anabolic effects and anti-estrogenic effects. To form other active hormones having similar activities the testosterone derivatives just mentioned were treated with lithium in ammonia to saturate the C-4 double bond and prepare the corresponding saturated androstane compounds. These compounds could also be prepared by first treating the 11-oxygenated testosterone derivatives to saturate the C-4 double bond to form the novel androstane-17β-ol-3,11-dione and androstan-11β, 17β-diol-3-one (and by conventional esterfication their 17-esters) as well as their 17α-methyl derivatives. By then treating the 11-oxygenated androstane derivatives thus produced with ethyl formate and sodium hydride there is formed the corresponding 11-oxygenated 2-hydroxymethylene androstane compounds, useful androgenic type hormones having anabolic properties which could be converted to the corresponding 2α-methyl derivatives in a one step hydrogenation. By conventional esterification procedures there was also prepared the conventional active esters of non-tertiary hydroxy groups of the novel compounds of the present invention.

The novel active compounds of the present invention may therefore be illustrated by the following formula:

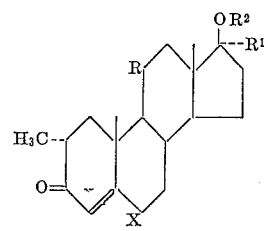 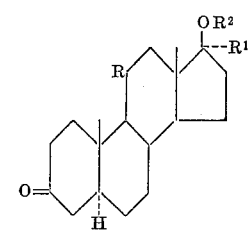

and

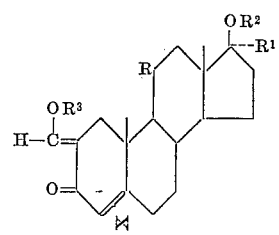

In the above formula R represent =O or —OH, $R^1$ represents hydrogen or lower alkyl such as methyl or ethyl. $R^2$ represents hydrogen when $R^1$ is lower alkyl and $R^2$ represents either hydrogen or an acyl group of 2 to 12 carbon atoms of a hydrocarbon carboxylic acid which may be straight or branched chain aliphatic, cyclic or mixed cyclic-aliphatic, saturated or unsaturated, unsubstituted or substituted as conventional in the steroid art with such groups a methoxy, ethoxy or halogen. Examples of such acyl groups are acetates, propionates, butyrates, hemisuccinates, caproates, benzoates, trimethyl acetates, phenoxypropionates, cyclopentylpropionates and β-chloro propionates. X represents either a double bond in position C-4, C-5 or X represents a saturated linkage in the case of ring A, B saturated allo compounds. $R^3$ represents hydrogen or the same acyl groups hereinbefore set forth in the definition of $R^2$.

The novel compounds of the present invention may be prepared by a process illustrated by the following equation:

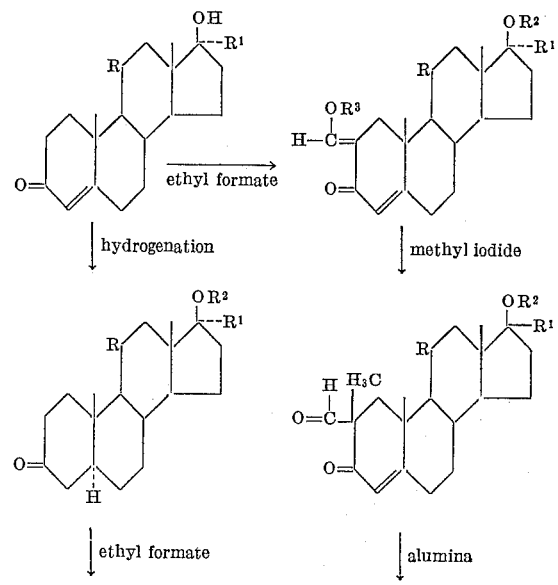

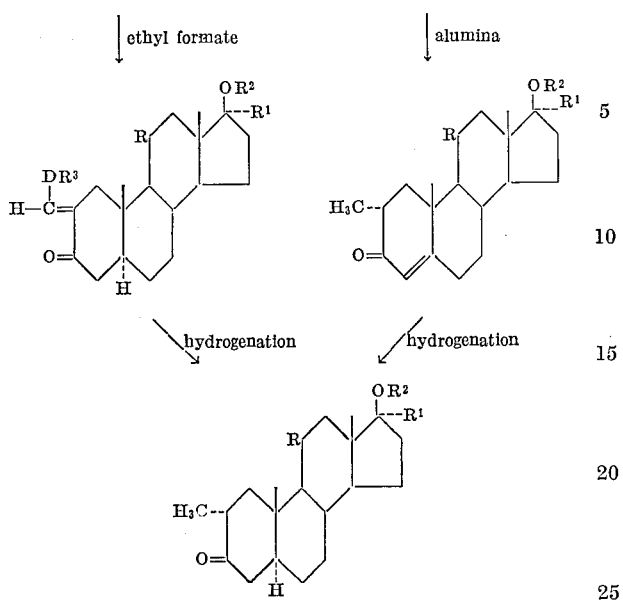

In the above equation R, $R^1$, $R^2$ and $R^3$ represent the same groups heretofore set forth.

In practicing the process above outlined, the 11-oxygenated testosterone or its 17α-lower alkyl derivatives are suspended in an inert organic solvent such as benzene and mixed with ethyl formate and sodium hydride. The reaction mixture is maintained at room temperature with stirring and under a nitrogen atmosphere for a period of time of the order of 5 hours. The resultant sodium salt of the resultant 2-hydroxymethylene compound and excess of sodium hydride was separated from the reaction mixture as by filtration and treated with a dilute acid such as hydrochloric acid to precipitate the desired 2-hydroxymethylene 11-oxygenated testosterone or the corresponding 17α-lower alkyl compounds. These compounds could be conventionally treated with acid anhydrides or acyl chlorides (corresponding to the acyl groups previously set forth in the definition of $R^2$ and $R^3$) to form the esters of the hydroxy group of the hydroxymethylene as well as any secondary 17β-hydroxy group (the 11β-hydroxy is as known relatively inactive). Both the 2-hydroxymethylene derivatives and the esters thereof were active androgenic type hormones having the properties previously set forth.

For the reaction with methyl iodide the free 2-hydroxymethylene derivatives were treated in an organic solvent suspension with methyl iodide and sodium hydride under reflux conditions and nitrogen atmosphere. The reaction was continued for about 72 hours with successive increments of the iodide added at intervals of 24 hours to form the corresponding 2-methyl-2'-formyl 11-oxygenated testosterone or 17α-lower alkyl testosterone derivative. These compounds on treatment with activated alkaline alumina (of the type conventionally used for chromatography) lost the elements of carbon monoxide to give the desired final 2α-methyl corresponding compounds which were conventionally acylated (when provided with a secondary 17β-hydroxy group) to the corresponding esters of the character set forth. The double bond of these compounds was then saturated preferably by using lithium metal in liquid ammonia since this method produces exclusively the desired 5-allo derivative. By this step there was prepared the desired 2α-methyl-androstan-17-ol-3-one compounds having an 11-keto or 11β-hydroxy group as well as their 17α-lower alkyl derivatives. Here again the secondary 17β-hydroxy groups were conventionally esterified.

As indicated in the equation the preparation of these androstane derivatives may be simplified by first treating the 11-oxygenated testosterone (or its derivatives) starting material with lithium metal in liquid ammonia to saturate the double bond, and form the novel 11-oxygenated saturated compounds previously set forth, then reacting with ethyl formate to produce the corresponding 2-hydroxymethylene-11-keto or 11β-hydroxy-androstan-17β-ol-3-one compounds or their 17α-lower alkyl derivatives. These compounds are also active androgenic type hormones and may also be acylated to the corresponding esters indicated in the formulas previously set forth. Further, these compounds whether esterified or not may be directly catalitically hydrogenated to the same 2α-methyl saturated compounds previously set forth.

The following examples serve to illustrate the present invention but are not intended to limit the same:

Example I

A suspension of 10 g. of 11-keto-testosterone in 500 cc. of thiophene free anhydrous benzene was treated with 10 cc. of ethyl formate and 3 g. of sodium hydride and the mixture was stirred under an atmosphere of nitrogen for 5 hours at a temperature around 25° C. The resulting sodium salt of the hydroxymethylene compound and the excess of sodium hydride was collected by filtration and the mixture of salts was washed with benezene and dried. Under strong stirring, the precipitate was added to 500 cc. of aqueous hydrochloric acid and the stirring was continued for 30 minutes at the end of which the precipitate was collected and well washed with distilled water, thus producing 2-hydroxymethylene-11-keto-testosterone.

This 2-hydroxymethylene-11-keto-testosterone was added to a suspension of 700 mg. of sodium hydride in 200 cc. of benzene, 40 cc. of methyl iodide was added and the mixture was refluxed under nitrogen for 24 hours. An additional 40 cc. of methyl iodide was added and the mixture was refluxed again. After 24 hours 40 additional cc. of methyl iodide was added and the refluxing was continued for 24 hours further. The cooled mixture was then washed with 1% aqueous sodium hydroxide solution, the organic layer was separated and evaporated to dryness under reduced pressure and the residue was crystallized from acetone-hexane, thus giving 2-methyl-2'-formyl-11-keto-testosterone.

5 g. of the above compound was dissolved in benzene and transferred to a column of 500 g. of activated alkaline alumina. After 24 hours the column was eluted with ethyl acetate and the eluates were crystallized from acetone-hexane, thus producing the pure 2α-methyl-11-keto-testosterone.

A solution of 1 g. of this compound in 50 cc. of methanol was mixed with 0.4 g. of 10% palladium on carbon catalyst and hydrogenated at approximately 25° C. and atmospheric pressure until the uptake of hydrogen ceased. The catalyst was removed by filtration and the solution was mixed with 0.2 g. of potassium hydroxide dissolved in 1 cc. of water and the mixture was kept standing at room temperature for 1 hour. 0.3 cc. of acetic acid was then added and the solution was evaporated to dryness under reduced pressure. The residue was treated with water, extracted with methylene dichloride, washed with water, dried over anhydrous sodium sulfate and again evaporated to dryness under vacuum. The residue was dissolved in benzene and passed through a column of 25 g. of alkaline alumina. The column was washed with several successive fractions of 16 cc. of benzene. The desired product was eluted in fractions 2-6 which were evaporated to dryness. Crystallization from a mixture acetone-hexane afforded the pure 2α-methyl androstan-17β-ol-3,11-dione.

Example II

A solution of 5 g. of 11β-hydroxy-testosterone in a mixture of 50 cc. of dioxane and 50 cc. of absolute ether was added dropwise to a stirred solution of 0.25 g. of lithium metal in 250 cc. of liquid ammonia which had a blue color which disappeared at the end of the addition of the steroid. A small amount of lithium was added until the blue color reappeared and persisted. There was then added 7.5 of solid ammonium chloride, the ammonia was allowed to evaporate, the residue was treated with water and chloroform, and the organic layer was washed with dilute hydrochloric acid, sodium carbonate solution and water. The solvent was removed by distillation and the residue was dissolved in a mixture benzene-hexane. This solution was chromatographed in a column in neutral washed alumina, thus yielding androstane-11β,17β-diol-3-one.

2 g. of this compound was treated with 2 cc. of ethyl formate and 0.6 cc. of sodium hydride, in benzene solution, in accordance with the method described in the previous example. There was thus obtained 2-hydroxymethylene-androstan-11β-diol-3-one.

1 g. of this compound was hydrogenated by the same method as described in the previous example to yield 2α-methyl-androstane-11β,17β-diol-3-one.

*Example III*

By proceeding in accordance with Example I starting from 17α-methyl-11-keto-testosterone there was obtained 2-hydroxymethylene-17α-methyl-11-keto-testosterone, 2α,17α-dimethyl-11-keto-testosterone and 2α,17α-dimethyl-androstan-17β-ol-3,11-dione, and from 17α-methyl-11β-hydroxy-testosterone, 2-hydroxymethylene-11β-hydroxy-testosterone and 2α,17α-dimethyl-androstan-11β,17β-diol-3-one.

By proceeding according to the method of Example II from 11-keto-testosterone there was first obtained androstan-17β-ol-3,11-dione and then 2-hydroxymethylene-androstan-17β-ol-3,11-dione. From 17α-methyl-11-keto-testosterone there was first obtained 17α-methyl-androstan-17β-ol-3,11-dione and then 2-hydroxymethylene-17α-methyl-androstan-17β-ol-3,11-dione and 2α,17α-dimethyl-androstan-17β-ol-3,11-dione, and from 17α-methyl-11β-hydroxy testosterone there was first obtained 17α-methyl-androstan-11β,17β-diol-3-one and then 2-hydroxymethylene-17α-methyl-androstan-11β,17β-diol-3-one and 2α,17α-dimethyl-androstan-11β,17β-diol-3-one.

*Example IV*

A mixture of 1 g. of 2α-methyl-11-keto-testosterone, obtained in accordance with the method described in Example I, 10 cc. of pyridine and 2 cc. of acetic anhydride was kept at room temperature for 16 hours, poured into water, extracted with methylene dichloride, washed with dilute hydrochloric acid, sodium bicarbonate solution and water, dried over anhydrous sodium sulfate and evaporated to dryness under reduced pressure. There was thus obtained the acetate of 2α-methyl-11-keto-testosterone.

By reaction with acid anhydrides or chlorides having from 2 to 12 carbon atoms including those specifically previously referred to, in pyridine solution, there was similarly effected the esterfication of the primary and secondary hydroxyl groups present in all of the compounds described in the previous examples excepting the 11β-hydroxyl groups.

We claim:
1. A process for the production of 2α-methyl-androstan-17β-ol-3-one derivatives comprising reacting the corresponding androstane derivatives with ethyl formate in the presence of sodium hydride to form the corresponding 2-hydroxymethylene compounds and converting these compounds to the corresponding 2α-methyl derivatives by hydrogenation in the presence of a palladium catalyst.
2. A compound of the following formula:

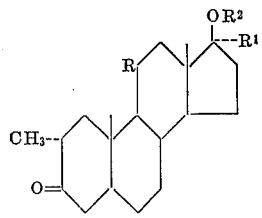

wherein R is selected from the group consisting of =C and —OH, $R^1$ is selected from the group consisting of hydrogen and lower alkyl and $R^2$ is hydrogen when R is alkyl and is selected from the group consisting of hydrogen and a hydrocarbon carboxylic acyl group of 2 to 12 carbon atoms when $R^1$ is hydrogen.

3. 2α-methyl-androstan-17β-ol-3,11-dione.
4. The hydrocarbon carboxylic acid esters of 2 to 12 carbon atoms of 2α-methyl-androstan-17β-ol-3,11-dione.
5. 2α-methyl-androstan-11β,17β-diol-3-one.
6. The hydrocarbon carboxylic acid esters of 2 to 12 carbon atoms of 2α-methyl-androstan-11β,17β-diol-3-one
7. 2α,17α-dimethyl-androstan-17β-ol-3,11-dione.
8. 2α,17α-dimethyl-androstan-11β,17β-diol-3-one.
9. The hydrocarbon carboxylic acid esters of 2 to 12 carbon atoms of 2-hydroxymethylene-11-keto-testosterone
10. 2-hydroxymethylene-androstan-17β-ol-3,11-dione.
11. 2-hydroxymethylene-11β-hydroxy-testosterone.
12. The 2,17-hydrocarbon carboxylic acid diesters of 2 to 12 carbon atoms of 2-hydroxymethylene-11β-hydroxy-testosterone.
13. 2-hydroxymethylene-androstan-11β,17β-diol-3-one.
14. The 2,17-hydrocarbon carboxylic acid diesters of 2 to 12 carbon atoms of 2-hydroxymethylene-androstan 11β,17β-diol-3-one.
15. 2-hydroxymethylene-17α-methyl-androstan-17β-ol-3,11-dione.
16. The hydrocarbon carboxylic acid esters of 2 to 12 carbon atoms of 2-hydroxymethylene-17α-methyl-androstan-17β-ol-3,11-dione.
17. 2-hydroxymethylene-17α-methyl-androstan-11β,17β-diol-3-one.
18. The 2,17-hydrocarbon carboxylic acid diesters of 2 to 12 carbon atoms of 2-hydroxymethylene-17α-methyl-androstan-11β,17β-diol-3-one.
19. A compound selected from the group consisting of

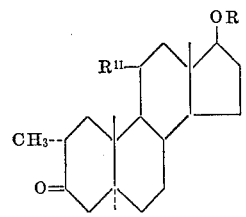

and

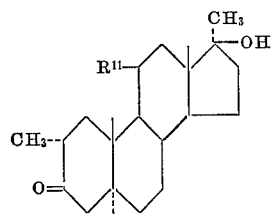

wherein R is selected from the group consisting of hydrogen and an acyl group of a hydrocarbon carboxylic acid of 2 to 12 carbon atoms and $R^{11}$ is selected from the group consisting of β-hydroxy and keto.

20. A process for the production of 2α-methylandrostan-17β-ol-3-one derivatives comprising reacting the corresponding androstane derivatives with ethyl formate in the presence of sodium hydride to form the corresponding 2-hydroxymethylene compounds and convering these compounds to the corresponding 2α-methyl derivatives by reaction with methyl iodide followed by removal of carbon monoxide.

21. A compound of the formula:

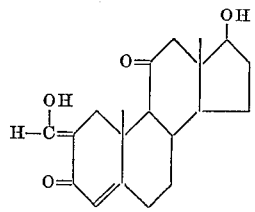

References Cited by the Examiner
UNITED STATES PATENTS

| | | | |
|---|---|---|---|
| 2,281,622 | 5/42 | Ruzicka | 260—397.1 |
| 2,842,570 | 7/58 | Herr | 260—397.45 |
| 2,861,087 | 11/58 | Herr | 260—397.5 |
| 2,881,188 | 4/59 | Babcock et al. | 260—397.3 |
| 2,881,191 | 4/59 | Herr | 260—397.45 |
| 2,883,401 | 4/59 | Babcock et al. | 260—397.45 |
| 2,908,693 | 10/59 | Ringold et al. | 260—397.4 |
| 3,074,568 | 7/62 | Kissman et al. | 260—239.55 |
| 3,074,932 | 1/63 | Schaub et al. | 260—239.5 |

LEWIS GOTTS, *Primary Examiner.*

B. E. LANHAM, JULIUS FROME, LESLIE H. GASTON, MORRIS LIEBMAN, IRVING MARCUS,
*Examiners.*